(12) United States Patent
Solowjow et al.

(10) Patent No.: US 12,456,287 B2
(45) Date of Patent: Oct. 28, 2025

(54) SYNTHETIC DATASET CREATION FOR OBJECT DETECTION AND CLASSIFICATION WITH DEEP LEARNING

(71) Applicant: Siemens Corporation, Washington, DC (US)

(72) Inventors: Eugen Solowjow, Berkeley, CA (US); Ines Ugalde Diaz, Redwood City, CA (US); Yash Shahapurkar, Berkeley, CA (US); Juan L. Aparicio Ojea, Moraga, CA (US); Heiko Claussen, Wayland, MA (US)

(73) Assignee: Siemens Corporation, Washington, DC (US)

( * ) Notice: Subject to any disclaimer, the term of this patent is extended or adjusted under 35 U.S.C. 154(b) by 110 days.

(21) Appl. No.: 18/578,471

(22) PCT Filed: Aug. 6, 2021

(86) PCT No.: PCT/US2021/044867
§ 371 (c)(1),
(2) Date: Jan. 11, 2024

(87) PCT Pub. No.: WO2023/014369
PCT Pub. Date: Feb. 9, 2023

(65) Prior Publication Data
US 2024/0296662 A1   Sep. 5, 2024

(51) Int. Cl.
*G06V 10/774* (2022.01)
*G06T 15/20* (2011.01)
(Continued)

(52) U.S. Cl.
CPC ............ *G06V 10/774* (2022.01); *G06T 15/20* (2013.01); *G06V 10/764* (2022.01); *G06V 10/776* (2022.01); *G06V 20/70* (2022.01)

(58) Field of Classification Search
CPC .. G06V 10/774; G06V 10/764; G06V 10/776; G06V 20/70; G06V 20/00;
(Continued)

(56) References Cited

U.S. PATENT DOCUMENTS 12,154,226 B2 * 11/2024 Saha .................. G06N 3/047
12,217,332 B2 *  2/2025 Hung .................. G06T 11/00
(Continued)

OTHER PUBLICATIONS

Lin Yangbo et al: "A Vision-Guided Robotic Grasping Method for Stacking Scenes Based on Deep Learning", 2019 IEEE 3rd Advanced Information Management, Communicates, Electronic and Automation Control Conference (IMCEC), IEEE, Oct. 11, 2019 (Oct. 11, 2019), pp. 91-96, XP033705186/ Oct. 11, 2019.
(Continued)

*Primary Examiner* — Vijay Shankar (57) ABSTRACT

A computer-implemented method for building an object detection module uses mesh representations of objects belonging to specified object classes of interest to render images by a physics-based simulator. Each rendered image captures a simulated environment containing objects belonging to multiple object classes of interest placed in a bin or on a table. The rendered images are generated by randomizing a set of parameters by the simulator to render a range of simulated environments. The randomized parameters include environmental and sensor-based parameters. A label is generated for each rendered image, which includes a two-dimensional representation indicative of location and object classes of objects in that rendered image frame. Each rendered image and the respective label constitute a data sample of a synthetic training dataset. A deep learning model is trained using the synthetic training dataset to output object classes from an input image of a real-world physical environment.

12 Claims, 4 Drawing Sheets

(51) Int. Cl.
*G06V 10/764* (2022.01)
*G06V 10/776* (2022.01)
*G06V 20/70* (2022.01)

(58) Field of Classification Search
CPC ....... G06T 15/20; G06T 15/00; G06T 15/005; G06T 15/10; G06T 15/205; G06T 17/00; G06T 17/05; G06T 17/10
See application file for complete search history.

(56) References Cited

U.S. PATENT DOCUMENTS 12,307,600 B2 * 5/2025 Mech .................. G06T 5/60
2024/0335941 A1 * 10/2024 Aparicio Ojea ....... B25J 9/1697

OTHER PUBLICATIONS

Xinyi Ren et al. "Domain Randomization for Active Pose Estimation"; Mar. 10, 2019; 7 pages.
Tobin Josh et al: "Domain Randomization for Transferring Deep Neural Networks from Simulation to the Real World", arxiv.org, Cornell University Library, 201 Olin Library Cornell University Ithaca, NY14853, XP080758342, DOI: 10.1109/IROS.2017.8202133, cited in the application, the whole document.
Mitash, Chaitanya et al: "Physics-based Scene-level Reasoning for Object Pose Estimation in Clutter"; arxiv.org, Cornell University Library; 201 Olin Library Cornell University Ithaca, NY 14853; Apr. 1, 2019; XP081200686; pp. 1-18.

* cited by examiner

SYNTHETIC DATASET CREATION FOR OBJECT DETECTION AND CLASSIFICATION WITH DEEP LEARNING

TECHNICAL FIELD

The present disclosure relates generally to the field artificial intelligence based object detection, and in particular, to a technique for creating a synthetic dataset for training a deep learning model for object detection and classification from input real-world images, to aid robotic manipulation tasks.

BACKGROUND

Artificial intelligence (AI) and robotics are a powerful combination for automating tasks inside and outside of the factory setting. In the realm of robotics, numerous automation tasks have been envisioned and realized by means of AI techniques. For example, there exist state-of-the-art solutions for visual mapping and navigation, object detection, grasping, assembly, etc., often employing machine learning such as deep neural networks or reinforcement learning techniques.

As the complexity of a robotic task increases, a combination of AI-enabled solutions may be required. In many robotic manipulation tasks, semantic recognition of objects being manipulated is necessary. In such cases, object detection neural networks are typically employed in combination with algorithms for motion planning.

A representative example of a robotic manipulation task is bin picking. Bin picking consists of a robot equipped with sensors and cameras picking objects with random poses from a bin using a robotic end-effector. Objects can be known or unknown, of the same type or mixed. A typical bin picking application consists of a set of requests for collecting a selection of said objects from a pile. At every request, the bin picking algorithm must calculate and decide which grasp the robot executes next. The algorithm may employ object detection neural networks in combination with grasp computation neural networks that use a variety of sensorial input. An object detection neural network is required, if the grasping task does not only consist of clearing a bin, but picking specific objects from a list. In some examples, an object detector may input an RGB (Red-Green-Blue) image frame and detect an object of interest in the frame.

State-of-the-art techniques for generating training datasets for object detection neural networks use pretrained neural networks, where the first layers are not changed and only the last layers are retrained on the new objects. This is called transfer learning, which may reduce the required number of images per object class from tens of thousands to about a couple of hundred. Despite this progress, collecting couple of hundred images for each object class can still several take hours.

SUMMARY

Briefly, aspects of the present disclosure provide a technique for creating a synthetic dataset for training a deep learning model for object detection and classification from input real-world images A first aspect of the disclosure provides a computer-implemented method for building an object detection module. The method comprises obtaining mesh representations of objects belonging to specified object classes of interest. The method further comprises rendering a plurality of images by a physics-based simulator using the mesh representations of the objects. Each rendered image captures a simulated environment containing objects belonging to multiple of said object classes of interest placed in a bin or on a table. The plurality of rendered images are generated by randomizing a set of parameters by the simulator to render a range of simulated environments, the set of parameters including environmental and sensor-based parameters. The method further comprises generating a label for each rendered image, the label including a two-dimensional representation indicative of location and object classes of objects in the respective rendered image frame. Each rendered image and the respective label constitute a data sample of a synthetic training dataset. The method further comprises training a deep learning model using the synthetic training dataset to output object classes from an input image of a real-world physical environment.

Other aspects of the present disclosure implement features of the above-described methods in computer program products and computing systems.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present application will be described with reference to exemplary non-limiting embodiments.

Aspects of the present disclosure provide a synthetic pipeline for creating a dataset for training a deep learning model for object detection, minimizing or even eliminating the need to capture and manually label images of real-world objects for training. The term "object detection", as used herein, refers inclusively to the aspects of object recognition and classification (e.g., outputting bounding boxes and labels around objects of interest in an input image), as well as semantic image segmentation (i.e., outputting a pixel-wise mask of an input image)

One of the challenges associated with creating synthetic training datasets arises due to discrepancies between physics simulators and the real world. One known approach is system identification, which is a process of building a mathematical model for a physical system. Here the mathematical model is a physics simulator. To make the simulator more realistic, careful calibration is required, which is time consuming an often error prone. Furthermore, low-fidelity image renderers are often unable to reproduce the quality and noise produced by the real-world cameras used for testing. These differences are collectively referred to as "reality gap."

The methodology disclosed here utilizes a technique of domain randomization for addressing the reality gap. In domain randomization, instead of training a deep learning model on a single simulated environment rendered by a simulator, the simulator is randomized to create a variety of simulated environments with randomized parameters and train a model that works across all of them. With enough variability in simulation, the model can adapt to a real-world environment, which is expected to one sample in the rich distribution of training variations.

Domain randomization has been studied for pose estimation, as disclosed in the document: X. Ren, Jianlan Luo, Eugen Solowjow, Juan Aparicio Ojea, Abhishek Gupta, Aviv Tamar, Pieter Abbeel, "Domain Randomization for Active Pose Estimation", 2019 International Conference on Robotics and Automation (ICRA), 10 Mar. 2019.

The disclosed methodology provides an inventive adaptation of the general technique of domain randomization to create synthetic datasets for object detection/image segmentation neural networks. As a further aspect, an active learning methodology is disclosed, which involves re-rending and re-labeling synthetic images based on real-world performance of the neural network after it has been trained.

Figure 1:
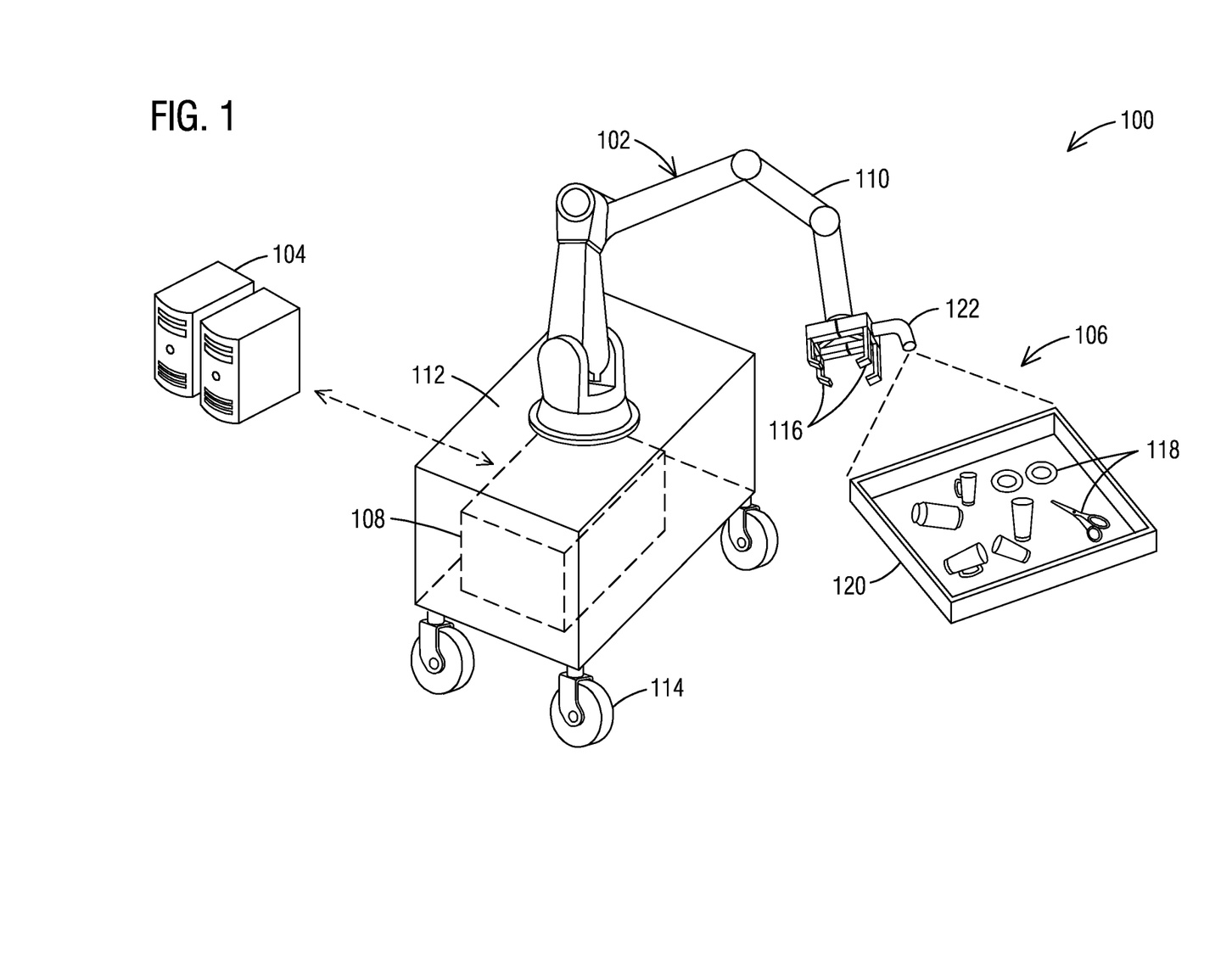
FIG. 1 illustrates an example of an autonomous system for carrying out robotic manipulation tasks, wherein aspects of the present disclosure may be implemented.

Referring now to FIG. 1, an exemplary autonomous system 100 is illustrated where aspects of the present disclosure may find an application. The autonomous system 100 may be implemented, for example, in a factory setting. In contrast to conventional automation, autonomy gives each asset on the factory floor the decision-making and self-controlling abilities to act independently in the event of local issues. The autonomous system 100 comprises one or more controllable devices, such as a robot 102. The one or more devices, such as the robot 102, are controllable by a control system 104 to execute one or more industrial tasks within a physical environment 106. Examples of industrial tasks include assembly, transport, or the like. As used herein, a physical environment can refer to any unknown or dynamic industrial environment. The physical environment 106 defines an environment in which a task is executed by the robot 102, and may include, for example, the robot 102 itself, the design or layout of the cell, workpieces handled by the robot, tools (e.g., fixtures, grippers, etc.), among others.

The control system 104 may comprise an industrial PC, or any other computing device, such as a desktop or a laptop, or an embedded system, among others. The control system 104 can include one or more processors configured to process information and/or control various operations associated with the robot 102. In particular, the one or more processors may be configured to execute an application program, such as an engineering tool, for operating the robot 102.

To realize autonomy of the system 100, in one embodiment, the application program may be designed to operate the robot 102 to perform a task in a skill-based programming environment. In contrast to conventional automation, where an engineer is usually involved in programming an entire task from start to finish, typically utilizing low-level code to generate individual commands, in an autonomous system as described herein, a physical device, such as the robot 102, is programmed at a higher level of abstraction using skills instead of individual commands. The skills are derived for higher-level abstract behaviors centered on how the physical environment is to be modified by the programmed physical device. Illustrative examples of skills include a skill to grasp or pick up an object, a skill to place an object, a skill to open a door, a skill to detect an object, and so on.

The application program may generate controller code that defines a task at a high level, for example, using skill functions as described above, which may be deployed to a robot controller 108. From the high-level controller code, the robot controller 108 may generate low-level control signals for one or more motors for controlling the movement of the robot 102, such as angular position of the robot arms, swivel angle of the robot base, and so on, to execute the specified task. In other embodiments, the controller code generated by the application program may be deployed to intermediate control equipment, such as programmable logic controllers (PLC), which may then generate low-level control commands for the robot 102 to be controlled. Additionally, the application program may be configured to directly integrate sensor data from physical environment 106 in which the robot 102 operates. To this end, the control system 104 may comprise a network interface to facilitate transfer of live data between the application program and the physical environment 106.

Still referring to FIG. 1, the robot 102 can include a robotic arm or manipulator 110 and a base 112 configured to support the robotic manipulator 110. The base 112 can include wheels 114 or can otherwise be configured to move within the physical environment 106. The robot 102 can further include an end effector 116 attached to the robotic manipulator 110. The end effector 116 can include one or more tools configured to grasp and/or move an object 118. In the shown scenario, the objects 118 are placed in a receiver or "bin." Example end effectors 116 include finger grippers or vacuum-based grippers. The robotic manipulator 110 can be configured to move so as to change the position of the end effector 116, for example, so as to place or move objects 118 within the physical environment 106. The autonomous system 100 can further include one or more cameras or sensors (typically multiple sensors), one of which is depicted as sensor 122 mounted to the robotic manipulator 110. The sensors, such as sensor 122, are configured to capture images of the physical environment 106 to enable the autonomous system to perceive and navigate the scene.

A representative example of a robotic manipulation task is bin picking. Although an example application of the disclosed methodology has been described in relation to bin picking, the disclosed methodology may find application in a variety of manipulation tasks, such as kitting, or other assembly operations where semantic recognition of objects being manipulated is necessary.

A bin picking application involves grasping objects, in a singulated manner, from a group of objects placed in a bin or on a table. In the shown illustration, multiple objects 118 are placed in a bin 120. The bin picking task involves grasping objects 118 individually by the robotic manipulator 110, using the end effectors 116. The objects 118 may be arranged in arbitrary poses within the bin 120. The objects 118 may be of assorted types, as shown in FIG. 1. The physical environment, which includes the objects 118 placed in the bin 120, is perceived via images captured by one or more sensors. The sensors may include, one or more single or multi-modal sensors, for example, RGB sensors, depth sensors, infrared cameras, point cloud sensors, etc., which may be located strategically to collectively obtain a full view of the bin 120.

Output from the sensors may be fed to one or more object detection algorithms and one or more grasp computation algorithms, which are deployed on the control system 104. The one or more grasp computation algorithms determine an optimal grasp (defined by a selected grasping location) to be executed by the robot 102. However, when the bin 120 contains an assortment of object types, the bin picking objective may require selectively picking objects 118 of a specified type (for example, pick only "cups"). In this case, in addition to determining an optimal grasp, it is necessary to perform a semantic recognition of the objects 118 in the scene. For this reason, bin picking of assorted or unknown objects involve a combination an object detection algorithm to localize an object of interest among the assorted pile, and a grasp computation algorithm to compute grasps given a 3D map of the scene. The object detection and grasp computation algorithms typically comprise deep learning models such as neural networks.

Grasp computation neural networks can be completely trained on synthetic data of arbitrary objects, after which they are able to generalize and compute grasp points on any object. For grasp computation, semantic recognition of object class is not required, because grasping is only dependent on local geometry of objects. On the other hand, neural networks for object detection particularly, semantic image segmentation, need to be trained on images of the specific object classes of interest, because there is a semantic meaning for each detected object. For example, the model needs to understand how a scissor looks like in order to detect a scissor later.

In order to train a neural network for object detection/semantic image segmentation, images are required for each object class of interest. In these images, the objects may need to be manually annotated and labeled with bounding boxes and/or contours and displayed in different poses under different environmental conditions, which is a time consuming process and is not easily scalable.

Figure 2:
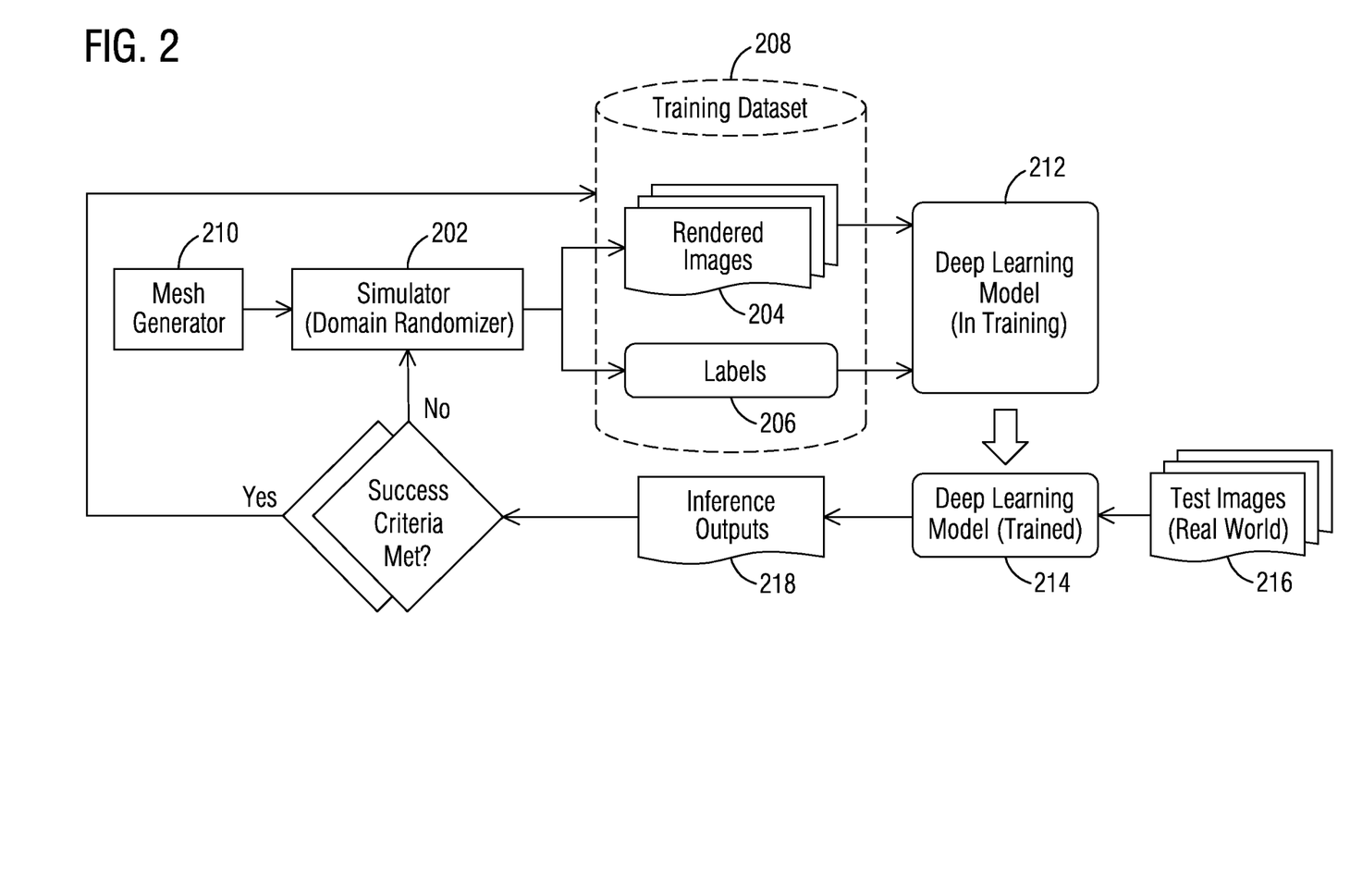
FIG. 2 is a schematic block diagram illustrating a pipeline for building an AI-based object detection module according to an exemplary embodiment of the disclosure.

FIG. 2 is a schematic block diagram illustrating functional blocks of a pipeline for building an AI-based object detection module according to one embodiment of the disclosure, which addresses some of the above-mentioned technical challenges. The functional blocks may be executed, for example, by the control system 104 shown in FIG. 1, or by another computing system (e.g., in a cloud computing environment) comprising at least one processor and a memory storing instructions that, when executed by the at least one processor, cause the computing system to carry out the described method. An example of a computing system within which aspects of the present disclosure may be implemented is described referring to FIG. 4. The embodiment shown in FIG. 2 is an exemplary implementation. It is to be understood that the general application of the proposed method may not necessarily involve each and every element shown in FIG. 2.

The term "module", as used herein, refers to a software component or part of a computer program that contains one or more routines, which is independent and interchangeable and configured to execute one aspect of a desired functionality. In the described embodiment, an object detection module comprises a deep learning model, such as a neural network. In embodiments, the computer program, of which the described module is a part, includes code for autonomously executing a skill function (i.e., pick up or grasp an object) by a controllable device, such as a robot.

Referring to FIG. 2, the described pipeline uses a physics-based simulator 202 capable of rendering images in a simulation environment. The simulator 202 renders a multiplicity of images 204, where each rendered image 204 captures a simulated environment containing objects belonging to multiple object classes of interest placed on a receiving structure, such as a table or a bin. Examples of a physics-based simulator suitable for this application include physics engines such as Bullet™, Mujoco™, among others, that may have built-in renderers. The images 204 are rendered by the simulator 202 by randomly placing 3D mesh representations (e.g., CAD models) of different classes of objects on a simulated tabletop or in a simulated bin. The objects of interest may comprise simple geometric objects or irregular objects, such as industrial components. Since the simulator 202 has access to ground truth, it can generate respective labels 206 for the rendered images 204. As described hereinafter, the label 206 of each rendered image 204 includes a two-dimensional representation indicative of location and object classes of objects in the respective rendered image frame. Each rendered image 204 and the respective label 206 constitute a data sample of a synthetic training dataset 208.

The 3D mesh representations of the objects of interest may be obtained, for example, from a CAD library comprising available CAD models of the objects of interest. However, a situation may be encountered when a mesh representation of an object of interest is not available, for example, when a CAD model of an industrial component constitutes proprietary information that is not shared or readily accessible. In such cases, mesh representations of one of more object classes may be generated by a mesh generator pipeline 210.

In a first example embodiment, the mesh generator 210 may use a robot with a sensor, such as an RGB-D sensor, to automatically scan a real-world object of interest. Each frame captured by the sensor may be converted into a point cloud. Point clouds from multiple frames may then be fused into a voxel grid to derive a parametrization of the object surface. The parametrization may comprise an implicit function, such as a signed distance function (SDF), which is defined such that it assigns a positive distance value for points inside a boundary (object surface) and negative distance value for points outside the boundary (or vice versa, with signs being reversed). The parametrization may define an iso-surface (e.g., zero iso-surface in case of SDF), which may be suitably transformed into a triangular or polygonal mesh, for example, using a Marching Cubes algorithm, among others.

In a second example embodiment, the mesh generator 210 may download a mesh representation of an object belonging to an object class of interest from a mesh database, which may be available online, such as Thingiverse, among many others. The downloaded mesh representation may be used to represent a real-world object of interest based on evaluation of a similarity metric between the downloaded mesh representation and the real-world object. The similarity metric may be based on one or more surface properties such as convex hull, surface normal, etc. In one implementation, the similarity metric may be based on the Euclidean distance (L2 norm) between the local curvature distributions over the mesh representations of the two objects, an example of which is detailed in the document: Heung-yeung Shum, Martial Hebert, Katsushi Ikeuchi, "On 3D Shape Similarity", November 1995, CMU-CS-95-212. Usability of a downloaded mesh representation may be determined when a similarity metric of the downloaded mesh representation and the real-world object differ within a defined threshold. The mesh generator 210 may download, for each object class, multiple mesh representations from one or more mesh databases, and select one that provides the closest similarity metric with a real-world object of the same object class.

The simulator 202 generates the rendered images 204 by randomizing a set of parameters to render a wide range of simulated environments. The rendered images 204 are generated with high variation in environmental parameters, such as number of objects, textures and lightings, and sensor-based parameters including settings of the simulation camera. The rendered images 204 do not have to match the real-world, such that low-quality fast rendering may be used for generating the training images. With an accurate 3D model of the object classes of interest, there exists a set of features that can be extracted from all rendered images 204 in the training dataset 208 which are sufficient for predicting the object class labels in real-world images.

For creating the dataset 208 for training a deep learning model for object detection/image segmentation, the following parameters may be varied by the simulator 202 to render the images 204:
  number and object classes of objects present in a scene;
  position and texture of objects on the table or in the bin;
  texture of background including the table or bin;
  camera settings, for example, including position, orientation and field of view of the simulation camera;
  lighting condition of scene; and
  optionally, type and amount of noise added to the images Each rendered image may comprise an RGB frame. In embodiments, random textures may be chosen for the object classes of interest and background elements (e.g., table or bin, wall, etc.) by selecting, for each object of interest and background element: a random RGB value, or a gradient between randomly selected RGB values, or a pattern involving multiple random RGB values. The rendering need not be photo-realistic, obviating the need for high-quality rendering or realistic choices of textures and lightings. With enough variability in the simulated data, the real-world appears to the model as just another variation.

Randomizing the camera settings used to render images in training avoids the need for calibration and precise placement of the camera in the real world. In one embodiment, a simulation camera may be placed at a simulated scene that approximately matches the position, orientation and field of view of the real-world camera. For rendering the image samples 204: the simulation camera may be randomly positioned within a defined region around the initial position; the camera orientation may be varied within a defined angle in both directions with respect to the initial orientation; and the field of view may be scaled up to a defined degree from the initial field of view. In other embodiments, the camera settings of the simulation camera may be randomized across a much wider range of settings, without an initial setting corresponding to a real-world camera. In one suitable implementation, one or more of the settings of the simulation camera (position, orientation, field of view) may be varied, for each scene, through a series of known transformations, to aid in determination of an optimal camera pose for recording real-world images for object detection.

In some embodiments, as an alternative to RGB-based object detection, RGB-D sensor data may be used for the task. Here, the rendered images 204 also include a depth frame. Data from available low-fidelity RGB-D sensors is often noisy and contains environmental and sensor-based distortions, such as missing data around edges, artifacts from reflection, etc. These distortions may be captured by a noise model of the real-world RGB-D sensor. In embodiments, the randomized set of parameters may additionally include environmental and sensor-based distortions obtained from the noise models of one or multiple RGB-D sensors.

Metadata of the rendered images 204 include object classes of the 3D mesh representations placed in the simulated environment to render each image sample. Such metadata can be used to generate a label 206 for each rendered image 204. As opposed to a pose estimation task where the label for each image comprises a location of a single object defined by x, y, z coordinates (typically of the center of mass of the object) in a real-world frame of reference, as per the disclosed method, the label 206 for each rendered image 204 includes a two-dimensional representation indicative of location and object classes of objects in the respective rendered image frame.

Figure 3:
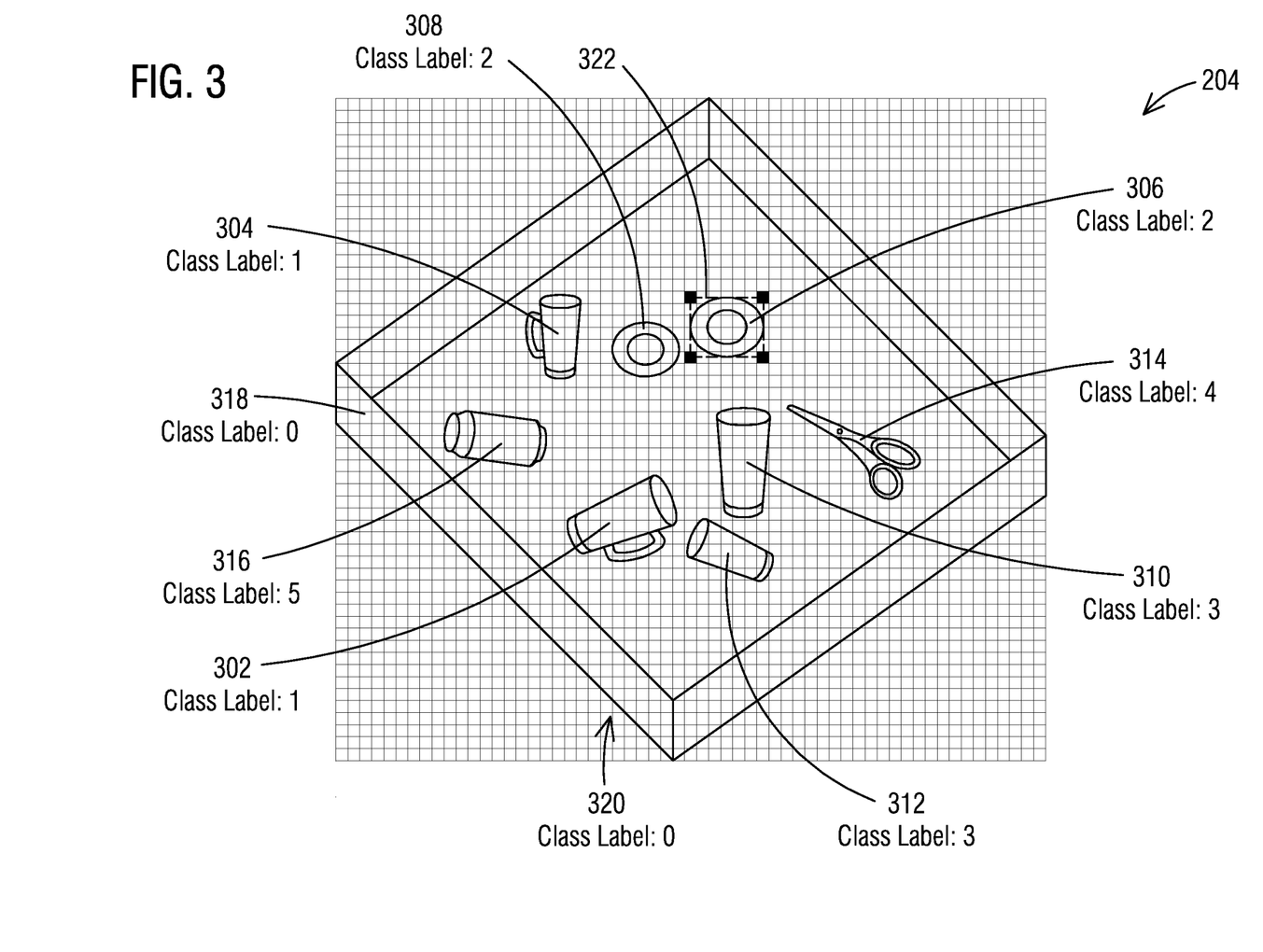
FIG. 3 illustrates an example of a rendered image generated by a simulator.

FIG. 3 illustrates an example of a rendered image 204 generated by the simulator 202. The drawing depicts pixels for the purpose of illustration, which are intentionally oversized for clarity. Also, for the sake of clarity, the image 204 is illustrated as a line drawing without illustration of any textural or lighting features. The rendered simulation environment comprises a randomized arrangement objects 302, 304, 306, 308, 310, 312, 314 and 316 belonging to five different object classes of interest, placed inside a simulated bin 318. As shown, each of the objects 302-316 is associated with a respective class label (1 to 5) indicative of the class (or type) of the object.

According to a first disclosed method of representing the dataset, generating a label for each rendered image comprises a pixel-wise labeling of the respective rendered image frame 204, where each pixel is labeled based on association with an object class of interest or background. In the example shown in FIG. 3, each pixel of the rendered image-frame 204 is assigned a class label which may take any integer value from 0 to 5 depending on its association with an object class of interest or background. The background 320 may include any element that does not belong to an object class of interest, including the bin 318, or any other distractor object(s), if present. Thus, the pixels associated with any of the objects of interest 302-316 are assigned the class label (1-5) for the respective object, while all other pixels are assumed to be associated with the background 320, including pixels associated with the bin 318, and are assigned class label 0. The generated label for the rendered image frame 204 is thus a two-dimensional pixel-wise representation of class label values.

According to a second disclosed method of representing the dataset, generating a label for each rendered image 204 comprises determining pixels that define a respective set of corner points, where each set of corner points corresponds to a bounding box around an object in the rendered image frame 204 belonging to one of the object classes of interest.

Each set of corner points is assigned a class label indicative of the object class of the respective bounded object. FIG. 3 illustrates a set of corner points, depicted by pixels filled in black color, for an object 306, that define a bounding box 322 around the object 306. In the shown example, these corner points are associated with a class label 2. The corner points can be determined based on metadata of the rendered image 204 that contains 3D information of the scene, which can be projected into the 2D image frame (x-y plane) to determine the extremities along the x and y axes of the object 306. The set pixels bounding the x and y extremities represent the set of corner points on which a rectangle may be fitted to generate the bounding box 322. In a similar manner, a set of corner points (pixels) defining respective bounding boxes may be determined for each object of interest in the rendered image frame 204 and assigned a class label. According to this methodology, the generated label for each rendered image frame 204 includes a two-dimensional representation of the locations of each set of corner point pixels, and the class label assigned to each set of corner point pixels.

Referring again to FIG. 2, with sufficient variability in the randomized parameters, the rendered images 204 and the respective labels 206 can be used to train a deep learning model 212 in a supervised learning regime to learn predictions based on geometrical properties of object classes of interest, abstracting away from other visual cues such as textures, lightings and background elements. The deep learning model 212 is thus able to extract features from the rendered images 204 that transfer well to real-world images. The resulting trained deep learning model 214 is thereby configured to output object classes from an input image of a real-world physical environment.

In one embodiment, the deep learning model 212 may comprise a skeleton model without using pre-trained weights. With a large amount of synthetic training data, random weight initialization may achieve comparable performance in transferring to the real world as does pre-trained weight initialization. In other embodiments, a model with pre-trained weights may used as the starting point, which may necessitate generating less training data.

The deep learning model 212 may comprise a convolutional neural network. The exact architecture of the neural network 212 is not a subject matter of the present disclosure. By way of example, the neural network 212 may comprise a region-based convolutional neural network (R-CNN). The R-CNN model may comprise multiple modules, including region proposal, and feature extractor and classifier modules. The region proposal module generates proposals about regions in an input image frame where there might be an object of interest. The feature extractor and classifier module extracts features from each candidate region and classifies features as one of the known object classes. In some embodiments, the model may generate a mask at the pixel level of the objects of interest in the candidate regions (image segmentation).

For testing, the trained deep learning model 214 may be deployed to run inferences on a set of real-world test images 216. In a further aspect of the disclosure, the training dataset 208 may be adjusted based on a performance of the trained model 214 on the real-world images 216, i.e., based on a measured success of the inference output 218 that is generated in response to each input test image 216. To measure success, one or more success criteria may be defined, which may include, whether an inference 218 contains a correct or incorrect label prediction and/or whether the confidence score of a label prediction is above or below a defined threshold.

Test images 216 for which the inference outputs 218 do not meet a first defined success criterion (e.g., failure to detect an object or very low confidence score of inference) may be identified as "failure" images, which is an indication that training data needs to be improved to provide better regression. An image identified as a "failure" image may be fed back to the simulator 202 to render additional images. The additional rendered images may be generated by randomizing the set of parameters around an environmental or sensor-based setting that corresponds to the "failure" image.

For example, a "failure" image may comprise a real-world test image 216 depicting a number of objects in a bin, where, for one (or more) of the objects, the trained deep learning model 214 has generated a bounding box with a label that is incorrect or has a low confidence score. The output 218 of the trained deep learning model 214 may be fed back to the simulator 202 to generate a large number of additional rendered images having the same or similar orientation of the concerned object(s) as in the "failure" image, but with randomization of other environmental parameters (including lighting, textures and surrounding objects) and/or—sensor based parameters (e.g., camera position, orientation and field of view). Alternately or additionally, based on the output 218, the simulator 202 may generate a large number of additional rendered images having the same or similar camera setting as in the "failure" image, but with randomized environmental based parameters (e.g., different poses of the incorrectly labeled object(s)).

The additional rendered images and the corresponding labels (e.g., generated as described above) may then be used to retrain the deep learning model. This closed loop approach can thus adjust the training data distribution to make sure that no blind spots exist in the dataset.

In a still further aspect, one or more "success" images may be identified from the set of test images 216 for which the generated inference outputs 218 meet a second defined success criterion. The second success criterion may be the same as or different from the first success criterion. In one embodiment, the second success criterion may specify a higher threshold for confidence score of inference compared to the first success criterion. An image identified as a "success" image and its respective label obtained from the inference output 218 may be fed back directly into the training dataset to retrain the deep learning model. The automatic annotation (generating labels) of test images 216 by the model inference engine can thus be used to add labeled real-world representations in the training dataset 208.

In a still further aspect, the disclosed method of domain randomization may be leveraged to determine an optimal camera pose for capturing real-world images for object detection. Here, during the creation of the training dataset 208 for training the deep learning model 212, for each simulated scene setup, a number of images 204 are rendered by the simulator 202 by varying a pose or camera setting of the simulation camera (i.e., one or more parameters out of position, orientation, field of view) through a series of known transformations, in addition to randomizing environmental parameters such as texture, lighting conditions, etc. The series of transformations can define a set of discrete camera poses along a continuous trajectory. Respective labels 206 can be generated for the rendered images 204, for example, as discussed above, for training the deep learning model 212. Subsequently, for testing/validating the trained deep learning model 214, test images 216 are generated by applying the same series of known transformations of camera pose for each test scene. The transformations of the camera pose in the testing phase may be carried out, for example, using a robot-held camera, which can be actively moved by a robot manipulator. In other embodiments, the test images may be synthetically generated by the simulator 202. A continuous change in confidence scores of the model inference output as a function of the transformations may be identified as an indicator to determine an optimum camera pose in the real world. As an example, if a camera location at 1 m distance and 30-degree angle towards the table led to inference outputs that were 20% more successful than a 1.2 m distance and 10-degree angle towards the table, this information may be utilized to apply a bias to the recording setup in the real world. This involves, as an additional step to training with the randomized images, recording and statistically analyzing the metadata of the images containing information on the pose transformations. Using domain randomization to determine an optimal camera pose is particularly beneficial in situations where an object to detect does not have the best viewpoint (e.g., being hidden), and/or when an object has symmetries at a given camera viewpoint that make it hard to detect, etc.

Figure 4:
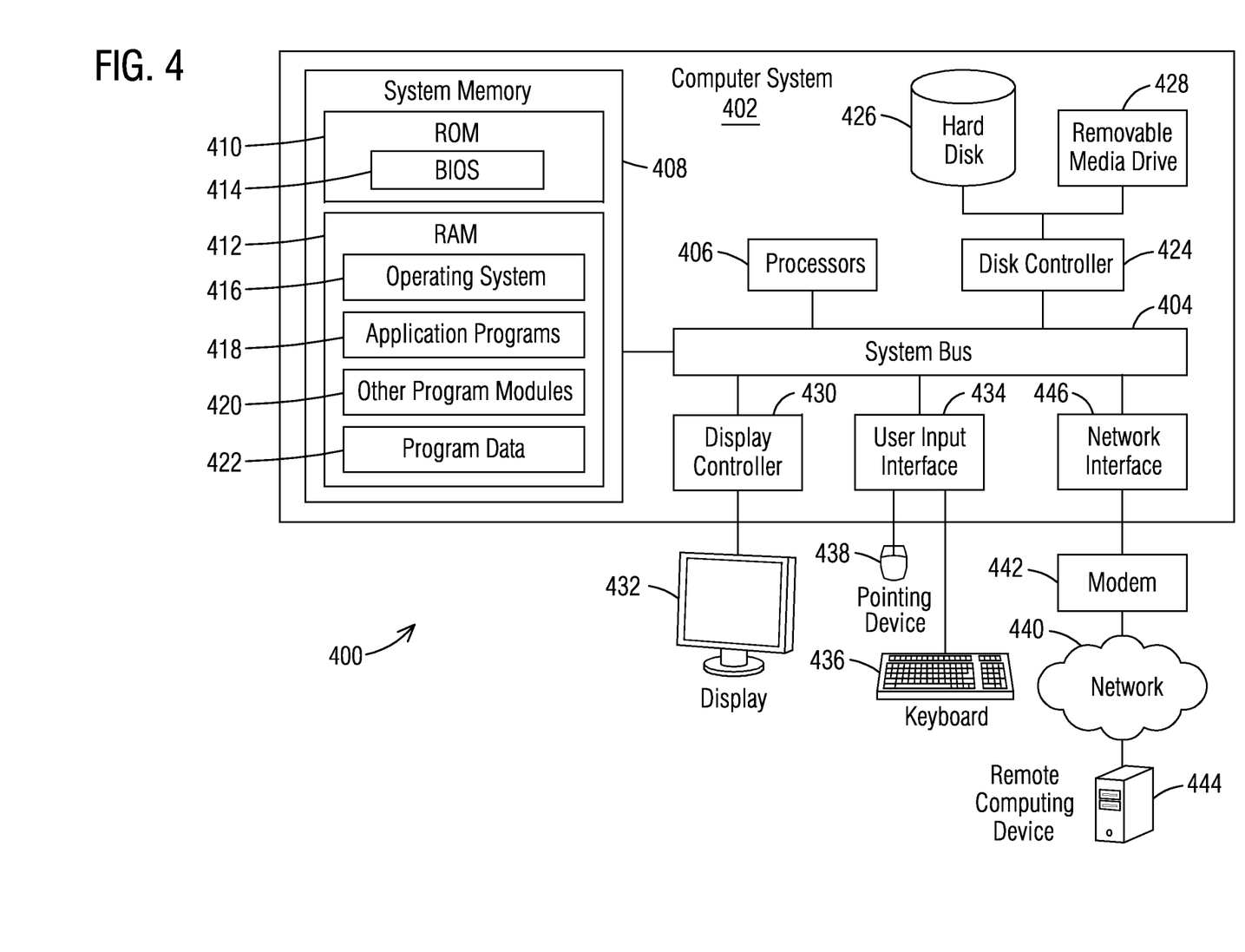
FIG. 4 is a schematic block diagram illustrating a computing environment in accordance with an example embodiment.

FIG. 4 illustrates an exemplary computing environment comprising a computer system 402, within which aspects of the present disclosure may be implemented. In one embodiment, the computing environment may comprise a cloud computing environment including one or more computing systems as described herein. Computers and computing environments, such as computer system 402 and computing environment 400, are known to those of skill in the art and thus are described briefly here.

As shown in FIG. 4, the computer system 402 may include a communication mechanism such as a system bus 404 or other communication mechanism for communicating information within the computer system 402. The computer system 402 further includes one or more processors 406 coupled with the system bus 404 for processing the information. The processors 406 may include one or more central processing units (CPUs), graphical processing units (GPUs), or any other processor known in the art.

The computer system 402 also includes a system memory 408 coupled to the system bus 404 for storing information and instructions to be executed by processors 406. The system memory 408 may include computer readable storage media in the form of volatile and/or nonvolatile memory, such as read only memory (ROM) 410 and/or random access memory (RAM) 412. The system memory RAM 412 may include other dynamic storage device(s) (e.g., dynamic RAM, static RAM, and synchronous DRAM). The system memory ROM 410 may include other static storage device (s) (e.g., programmable ROM, erasable PROM, and electrically erasable PROM). In addition, the system memory 408 may be used for storing temporary variables or other intermediate information during the execution of instructions by the processors 406. A basic input/output system 414 (BIOS) containing the basic routines that help to transfer information between elements within computer system 402, such as during start-up, may be stored in system memory ROM 410. System memory RAM 412 may contain data and/or program modules that are immediately accessible to and/or presently being operated on by the processors 406. System memory 408 may additionally include, for example, operating system 416, application programs 418, other program modules 420 and program data 422.

The computer system 402 also includes a disk controller 424 coupled to the system bus 404 to control one or more storage devices for storing information and instructions, such as a magnetic hard disk 426 and a removable media drive 428 (e.g., floppy disk drive, compact disc drive, tape drive, and/or solid state drive). The storage devices may be added to the computer system 402 using an appropriate device interface (e.g., a small computer system interface (SCSI), integrated device electronics (IDE), Universal Serial Bus (USB), or FireWire).

The computer system 402 may also include a display controller 430 coupled to the system bus 404 to control a display 432, such as a cathode ray tube (CRT) or liquid crystal display (LCD), among other, for displaying information to a computer user. The computer system 402 includes a user input interface 434 and one or more input devices, such as a keyboard 436 and a pointing device 438, for interacting with a computer user and providing information to the one or more processors 406. The pointing device 438, for example, may be a mouse, a light pen, a trackball, or a pointing stick for communicating direction information and command selections to the one or more processors 406 and for controlling cursor movement on the display 432. The display 432 may provide a touch screen interface which allows input to supplement or replace the communication of direction information and command selections by the pointing device 438.

The computing system 402 also includes an I/O adapter 446 coupled to the system bus 404 to connect the computing system 402 to a controllable physical device, such as a robot. In the example shown in FIG. 4, the I/O adapter 446 is connected to robot controller 448, which includes, for example, one or more motors for controlling linear and/or angular positions of various parts (e.g., arm, base, etc.) of the physical device or robot.

The computer system 402 may perform a portion or all of the processing steps of embodiments of the disclosure in response to the one or more processors 406 executing one or more sequences of one or more instructions contained in a memory, such as the system memory 408. Such instructions may be read into the system memory 408 from another computer readable storage medium, such as a magnetic hard disk 426 or a removable media drive 428. The magnetic hard disk 426 may contain one or more datastores and data files used by embodiments of the present disclosure. Datastore contents and data files may be encrypted to improve security. The processors 406 may also be employed in a multi-processing arrangement to execute the one or more sequences of instructions contained in system memory 408. In alternative embodiments, hard-wired circuitry may be used in place of or in combination with software instructions. Thus, embodiments are not limited to any specific combination of hardware circuitry and software.

The computer system 402 may include at least one computer readable storage medium or memory for holding instructions programmed according to embodiments of the disclosure and for containing data structures, tables, records, or other data described herein. The term "computer readable storage medium" as used herein refers to any medium that participates in providing instructions to the one or more processors 406 for execution. A computer readable storage medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 426 or removable media drive 428. Non-limiting examples of volatile media include dynamic memory, such as system memory 408. Non-limiting examples of transmission media include coaxial cables, copper wire, and fiber optics, including the wires that make up the system bus 404. Transmission media may also take the form of acoustic or light waves, such as those generated during radio wave and infrared data communications.

The computing environment 400 may further include the computer system 402 operating in a networked environment using logical connections to one or more remote computers, such as remote computing device 444. Remote computing device 444 may be a personal computer (laptop or desktop), a mobile device, a server, a router, a network PC, a peer device or other common network node, and typically includes many or all of the elements described above relative to computer system 402. When used in a networking environment, computer system 402 may include a modem 442 for establishing communications over a network 440, such as the Internet. Modem 442 may be connected to system bus 404 via network interface 446, or via another appropriate mechanism.

Network 440 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 402 and other computers (e.g., remote computing device 444). The network 440 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 440.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

The system and processes of the figures are not exclusive. Other systems, processes and menus may be derived in accordance with the principles of the disclosure to accomplish the same objectives. Although this disclosure has been described with reference to particular embodiments, it is to be understood that the embodiments and variations shown and described herein are for illustration purposes only. Modifications to the current design may be implemented by those skilled in the art, without departing from the scope of the disclosure.

What is claimed is:

1. A computer-implemented method for building an object detection module, comprising:
    obtaining mesh representations of objects belonging to specified object classes of interest,
    rendering a plurality of images by a physics-based simulator using the mesh representations of the objects, wherein each rendered image captures a simulated environment containing objects belonging to multiple of said object classes of interest placed in a bin or on a table, wherein the plurality of rendered images are generated by randomizing a set of parameters by the simulator to render a range of simulated environments, the set of parameters including environmental and sensor-based parameters,
    generating a label for each rendered image, the label including a two-dimensional representation indicative of location and object classes of objects in the respective rendered image frame, wherein each rendered image and the respective label constitute a data sample of a synthetic training dataset,
    training a deep learning model using the synthetic training dataset to output object classes from an input image of a real-world physical environment,
    deploying the trained deep learning model for testing on a set of real-world test images to generate an inference output for each test image,
    adjusting the training dataset based on a success of the generated inference outputs,
    identifying a "failure" image from the set of test images for which the generated inference output does not meet a defined success criterion,
    feeding the "failure" image to the simulator to render additional images by randomizing the set of parameters around an environmental or sensor-based setting that corresponds to the "failure" image and to generate a respective label for each additional rendered image, and
    retraining the deep learning model using the rendered additional images and the respective labels.

2. The method according to claim 1, wherein the set of randomized parameters comprise:
    number and object classes of objects present in a scene;
    position and texture of objects on the table or in the bin;
    texture of background including the table or bin;
    settings of simulation camera; and
    lighting condition of scene.

3. The method according to claim 1, wherein generating a label for each rendered image comprises pixel-wise labeling of the respective rendered image frame, wherein each pixel is labeled based on association with an object class of interest or background.

4. The method according to claim 1, wherein generating a label for each rendered image comprises:
    determining pixels that define a respective set of corner points, each set of corner points corresponding to a bounding box around an object in the rendered image belonging to one of the object classes of interest, and
    labeling each set of corner points indicative of an object class of the respective bounded object.

5. The method according claim 1, comprising:
identifying a "success" image from the set of test images for which the generated inference output meets a defined success criterion,
feeding the "success" image and respective label from the inference output to the training dataset to retrain the deep learning model.

6. The method according to claim 1, comprising:
for each simulated scene, rendering a plurality of images by the simulator by varying a camera pose of a simulation camera through a series of known transformations, in addition to randomizing environmental parameters, wherein the rendered images and respective labels are used for training the deep learning model,
testing the trained deep learning model on test images generated by applying said series of known transformations of camera pose for each test scene, and
determining an optimal camera pose for capturing real-world images for object detection based on identifying a continuous variation of confidence scores of inference outputs associated with the test images as a function of the applied transformations.

7. The method according to claim 1, wherein each rendered image comprises a RGB (Red-Green-Blue) frame.

8. The method according to claim 7, wherein each rendered image further comprises a depth frame, wherein the randomized set of parameters include environmental and sensor-based distortions obtained from a noise model of an RGB-D sensor.

9. The method according to claim 1, wherein the mesh representations are obtained by:
scanning a real-world object belonging to an object class of interest by a sensor,
converting each frame captured by the sensor to a point cloud,
fusing the point clouds from multiple frames to a voxel grid to derive a parametrization of an object surface, and
transforming the parametrized object surface into a 3D mesh model.

10. The method according to claim 1, wherein the mesh representations are obtained by:
downloading a mesh representation of an object belonging to an object class of interest from a mesh database, and
using the downloaded mesh representation to represent a real-world object of interest based on evaluation of a similarity metric between the downloaded mesh representation and the real-world object of interest.

11. A non-transitory computer-readable storage medium including instructions that, when processed by a computing system, configure the computing system to perform the method according to claim 1.

12. A computing system comprising:
a processor; and
a memory storing instructions that, when executed by the processor, cause the computing system to carry out a method according to claim 1.

* * * * *